United States Patent [19]

Baecker

[11] Patent Number: 5,733,613
[45] Date of Patent: Mar. 31, 1998

[54] SYNTHETIC PLASTIC SLEEVE HAVING A DRY FILM BIOCIDE INCORPORATED THEREIN AND METHOD FOR TREATING A TIMBER POLE TO INHIBIT SUB-SOIL BIO-DETERIORATION OF THE POLE

[76] Inventor: Albin Alexander Wladyslaw Baecker, 37 David McLean Drive, Westville, 3630, South Africa

[21] Appl. No.: 599,741

[22] Filed: Feb. 12, 1996

Related U.S. Application Data

[63] Continuation of Ser. No. 557,608, Nov. 14, 1995, abandoned, which is a continuation-in-part of Ser. No. 240,989, May 11, 1994, abandoned.

[30] Foreign Application Priority Data

May 14, 1993 [ZA] South Africa .................. 93/3382

[51] Int. Cl.$^6$ ................................ A01N 25/34
[52] U.S. Cl. ............. 428/34.9; 428/35.1; 428/35.2; 428/349; 428/913; 424/412; 156/86; 264/464; 52/170; 174/DIG. 8
[58] Field of Search ................... 428/34.9, 35.1, 428/35.2, 913, 347, 349; 424/405, 412, 411; 206/497; 156/84, 85, 86; 174/DIG. 8; 264/464; 52/170; 405/216

[56] References Cited

U.S. PATENT DOCUMENTS

| | | | |
|---|---|---|---|
| 3,755,224 | 8/1973 | Lutz, Jr. | 260/23 |
| 4,617,328 | 10/1986 | Liu | 523/122 |
| 4,666,956 | 5/1987 | Spielau et al. | 523/122 |
| 4,915,990 | 4/1990 | Chang | 428/34.9 |
| 5,035,886 | 7/1991 | Chakrabarti et al. | 424/78 |
| 5,070,597 | 12/1991 | Holt et al. | 428/34.9 |
| 5,142,010 | 8/1992 | Olstein | 526/248 |
| 5,149,365 | 9/1992 | Landsiedel et al. | 106/18.32 |
| 5,208,016 | 5/1993 | Ohmae et al. | 424/78.27 |
| 5,229,124 | 7/1993 | Rei et al. | 424/409 |
| 5,236,972 | 8/1993 | Reinhart | 523/122 |
| 5,284,844 | 2/1994 | Lorenz et al. | 514/222.5 |
| 5,287,967 | 2/1994 | Backhouse et al. | 206/524.7 |
| 5,298,249 | 3/1994 | Hani et al. | 424/405 |
| 5,328,743 | 7/1994 | Wynne et al. | 428/34.9 |

FOREIGN PATENT DOCUMENTS

| | | |
|---|---|---|
| 0 101 102 A3 | 2/1984 | European Pat. Off. . |
| 0 345 955 A1 | 5/1989 | European Pat. Off. . |
| 60078903 | 5/1985 | Japan . |
| 244737 | 9/1993 | New Zealand . |

OTHER PUBLICATIONS

Sheila Barry, The Proceedings of the Fourth International Biodeterioration Symposium, Berlin, "Comparative Field and Laboratory Testing of Fungicidal Emulsion Paints for Interior Use", 1980, pp. 345–351.

H. Gattner, et al., Biodeterioration, "Chemical Control of Growth on Paint Films and Plasters—A Contribution to the Current Situation", 1983, vol. 5, pp. 713–716.

Dr. Karl Wagner, "Aspects of Film Preservation", 1984, pp. 1–18.

Heaton, et al., International Biodeterioration, "Control of Mould Growth by Anti-fungal Paints", 1991, vol. 27, pp. 163–173.

Lewis Conquer, Specialty Chemicals and Paint and Ink International, "Biofouling Of Painted Surfaces: A Formulated Solution", Nov. 1991, pp. 1–3.

Primary Examiner—Rena Dye
Attorney, Agent, or Firm—Senniger, Powers, Leavitt & Roedel

[57] ABSTRACT

The invention relates to synthetic plastic sheeting which is in the form of a flexible synthetic plastic film of material which has a biocide incorporated therein. The biocide can serve to inhibit the growth of different microorganisms that cause bio-deterioration and, as such, the film can be used for packaging of or the covering, or protection of, products that are exposed to bio-deterioration. The sheeting can also be provided in sleeve form permitting fitting on timber poles, for covering regions of poles to be disposed underground, in use, thereby protecting these regions against bio-deterioration.

13 Claims, 1 Drawing Sheet

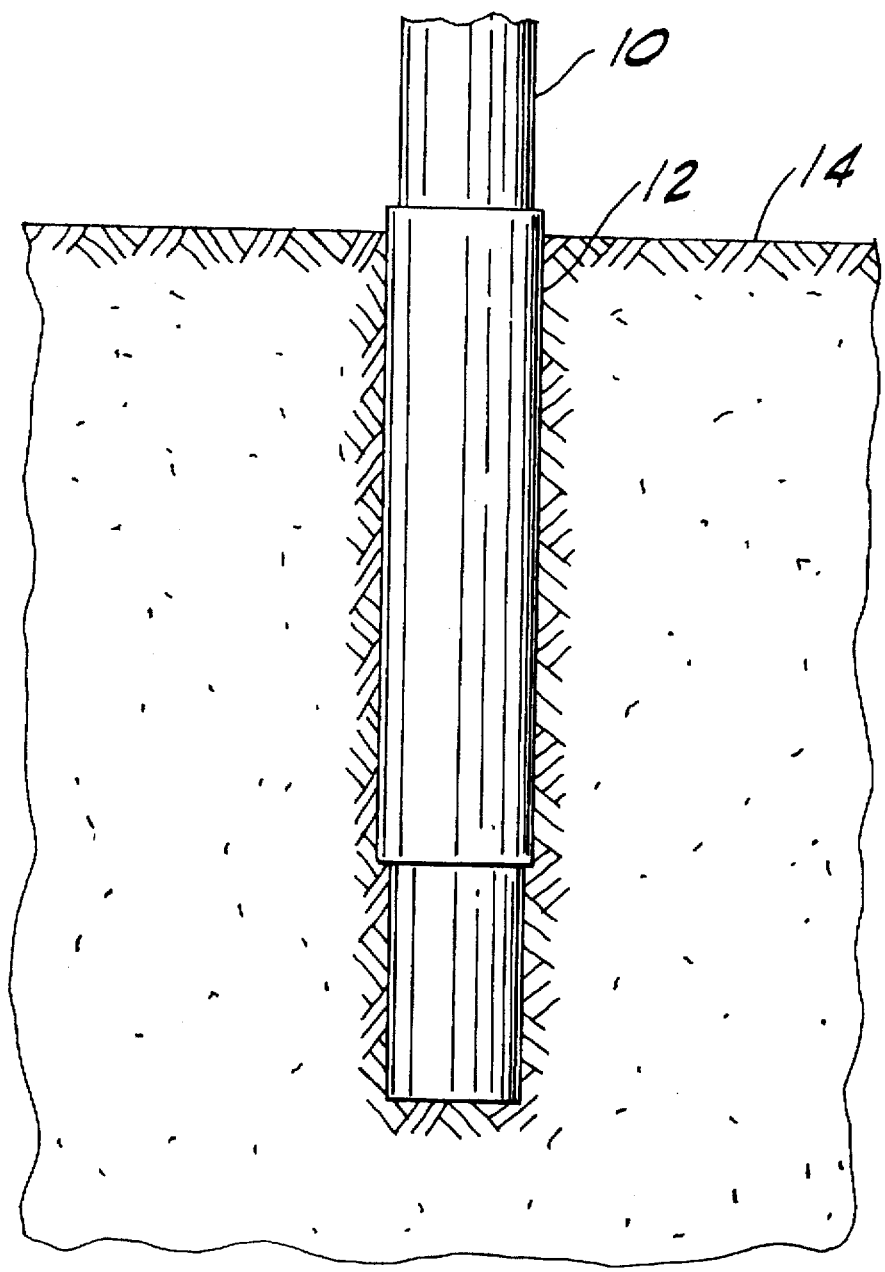

1

SYNTHETIC PLASTIC SLEEVE HAVING A DRY FILM BIOCIDE INCORPORATED THEREIN AND METHOD FOR TREATING A TIMBER POLE TO INHIBIT SUB-SOIL BIO-DETERIORATION OF THE POLE

REFERENCE TO RELATED APPLICATIONS

This application is a continuation of U.S. patent application Ser. No. 08/557,608, filed Nov. 14, 1995, now abandoned, which is a continuation-in-part of U.S. patent application Ser. No. 08/240,989, filed May 11, 1994, now abandoned, the entire disclosures of which are incorporated herein by reference.

BACKGROUND OF THE INVENTION

This invention relates to synthetic plastic sheeting. Synthetic plastic sheeting has a wide application within the packaging industry, as well as in various other industries and applications, where it is used for covering and/or protecting different articles, objects, and other subject matter. Many of the applications of synthetic plastic sheeting are associated with subject matter that is exposed to bio-deterioration as a result of the growth of different micro-organisms and where the subject matter has to be treated with or exposed to, for example, biocides, in order to inhibit the growth of micro-organisms. Many different biocides are known for the purpose, biocides being provided in the form of liquids, pastes, powders, solids, and other forms, in order to facilitate the treatment of subject matter and/or the exposure of subject matter thereto.

When subject matter that is exposed to bio-deterioration is required to be packaged within, covered by, or protected by synthetic plastic sheeting, the treatment with or exposure to suitable biocides constitutes separate and time consuming operations. As such, it is an object of this invention to at least alleviate this problem and to provide for required biocide treatment and/or biocide exposure to be facilitated.

SUMMARY OF THE INVENTION

Briefly, the present invention is directed to a synthetic plastic sleeve formed of synthetic plastic sheeting comprising a liquid impervious, non-biodegradable flexible synthetic plastic film. The film has a dry film biocide for inhibiting the growth of micro-organisms that cause bio-deterioration incorporated therein and has heat shrink properties. Furthermore, the sleeve is dimensioned to fit slideably over a timber pole to be covered and, by heating, to shrink tightly onto the pole.

The invention is further directed to a timber pole and a synthetic plastic sleeve in combination. The synthetic plastic sleeve is formed of synthetic plastic sheeting comprising a liquid impervious, non-biodegradable flexible synthetic plastic film. The film has a dry film biocide for inhibiting the growth of micro-organisms that cause bio-deterioration incorporated therein and has heat shrink properties. Furthermore, the sleeve is dimensioned to fit slideably over the timber pole so that it can be fitted onto a section of the pole. The sleeve is fitted onto a section of the pole and heat shrunk to secure the sleeve onto the pole.

The invention is further directed to a method for treating a timber pole to inhibit sub-soil bio-deterioration of the pole when supported in a soil body. The method comprises providing a synthetic plastic sleeve formed of synthetic plastic sheeting comprising a liquid impervious, non-biodegradable flexible synthetic plastic film. The film has a dry film biocide for inhibiting the growth of micro-organisms that cause bio-deterioration incorporated therein and has heat shrink properties. Furthermore, the sleeve is dimensioned to fit slideably over the timber pole. At least a portion of the pole exposed to sub-soil bio-deterioration when the pole is supported in the soil body is covered by sliding the sleeve over the pole. The sleeve is then heated to shrink the sleeve and secure the sleeve onto the pole.

Other objects and features of this invention will be in part apparent and in part pointed out hereinafter.

BRIEF DESCRIPTION OF THE DRAWING

The sole FIGURE is a side elevational view of a timber pole supported in a soil body having secured thereto a sleeve formed of flexible synthetic plastic sheeting in accordance with the present invention.

DETAILED DESCRIPTION OF THE PREFERRED EMBODIMENTS

According to the invention there is provided flexible synthetic plastic sheeting suitable for packaging of subject matter, covering of subject matter and protection of subject matter, which comprises a flexible synthetic plastic film of material which has a biocide for inhibiting the growth of micro-organisms that cause bio-deterioration incorporated therein. The synthetic plastic film having the biocide incorporated therein may be an extruded film having the biocide incorporated into the plastic material of which this film is formed, prior to the extrusion thereof. The synthetic plastic material of which the film is formed may be provided in granular form and the biocide may be incorporated therein in a powder or liquid form prior to extrusion of the synthetic plastic film. The synthetic plastic material of which the film is formed may be one of low density polyethylene, linear low density polyethylene, polyvinyl chloride, cross-linked polyethylene, and the like.

The biocide incorporated in the material of the synthetic plastic film may be a dry film biocide. As such, the biocide may include urea derivatives, isothiazolinone and glycols. One known biocide of this type is the biocide sold under the trade name "MYCAVOID DFP" commercially available from Bactria Laboratories, Temple Fields, Harlow, Essex CM 202 BH, England and comprising a mixture of methyl benzimidazole-2-YL 0 carbamate, 2-octyl-4-isothiazolinone-3-one and 3-(3,4-dichlorophenyl)-1,1-dimethyl urea.

The flexible synthetic plastic sheeting of the invention may be specifically adapted for use in different predetermined applications. As such, the flexible synthetic plastic film may be formed into the configuration of a bag for packaging foodstuffs, or the like.

Alternatively, the flexible synthetic plastic film may be provided in the form of a liquid impervious, non biodegradable elongated sleeve that can be fitted onto a timber pole to be supported in the ground for covering a desired area of the pole, i.e. the area of the pole that is exposed to sub-soil decay cased by a range of common and widespread fungi which inhabit the ground. Elongated sleeves provided for this purpose may have predetermined dimensions and shrinkage properties, permitting the sleeves to be fitted onto poles having predetermined diameters and to be securely located by being shrunk onto the poles by heating. The invention accordingly extends to a synthetic plastic sleeve formed of synthetic plastic sheeting which comprises a liquid impervious, non-bio-degradable flexible synthetic plastic film of material which has a biocide for inhibiting the growth of micro-organisms that cause bio-deterioration, incorporated therein, the sleeve being dimensioned to fit onto a predetermined diameter timber pole for covering a desired area thereof and having shrinkage properties to permit secure location of the sleeve on the timber pole by being shrunk onto the pole through heating.

The synthetic plastic film forming the sleeve and having the biocide incorporated therein may be extruded, having the biocide incorporated into the plastic material of which the film is formed, prior to the extrusion thereof. Furthermore, the synthetic plastic material of which the film is formed may be provided in granular form and the biocide may be incorporated therein in a powder or liquid form prior to extrusion of the synthetic plastic film. Still furthermore, the synthetic plastic material of which the film forming the sleeve is formed may be one of low density polyethylene, linear low density polyethylene, polyvinyl chloride, cross linked polyethylene, and the like.

The biocide incorporated in the material of the synthetic plastic film forming the sleeve may be a dry film biocide. As such, the biocide may include urea derivatives, isothiazolinone and glycols. Particularly, the previously described dry film biocide sold under the trade name "MYCAVOID DFP" may be employed.

The sleeve of the invention can thus form a physical barrier in the form of a liquid impervious non-biodegradable layer of material over a predetermined region of a timber pole where sub-soil decay of the pole can be prevented, or at least reduced, the biocide content of the sheeting enhancing the qualities of the material used for this purpose. Clearly, the specific synthetic plastic material used may be variable.

The regions of poles to be protected may be determined by specific applications of the poles, as well as the soil characteristics of the soil in which poles are to be supported. Furthermore, the synthetic plastic material qualities required for the above application may be variable, as well as the specific biocide incorporated into this material.

A particular example of flexible synthetic plastic sheeting, in accordance with the invention, is described hereinafter, as well as an example of one application of this flexible synthetic plastic sheeting which is illustrated by way of the accompanying FIGURE, which shows schematically in side view a sleeve formed of flexible synthetic plastic sheeting, in accordance with the invention, applied onto a timber pole.

One particular example of flexible synthetic plastic sheeting, in accordance with the invention, is in the form of a low density polyethylene film having incorporated therein the previously described biocide sold under the trade name "MYCAVOID DFP". This biocide is a dry film biocide and includes urea derivatives, isothiazolinone and glycols, which inhibit the growth of micro-organisms that cause bio-deterioration. Furthermore, this biocide is provided in a powder form and is dispersed into granules from which the film forming the plastic sheeting is formed, typically by an extrusion process. Particularly, the powder biocide and the granules may be mixed and provided in master batches, from which sheeting can be extruded. The method of producing this synthetic plastic film therefore provides for the dispersion of the biocide in its powder form into the granules from which the film is formed in order to form master batches, following which the sheeting can be formed by a conventional extrusion process, or any other conventional plastic sheet forming process. The biocide used clearly also can be incorporated into the material for forming a plastic film while in a liquid form.

The synthetic plastic sheeting as envisaged above can be used for many different applications where it is required to inhibit the growth of micro-organisms that cause bio-deterioration, typical applications including the packaging of foodstuffs and other products that can deteriorate. The exact form of the sheeting, as well as the thickness thereof, clearly will be determined by the required application of the sheeting and it will be understood also that sheeting can be formed, which incorporates alternative biocides that can act to inhibit the growth of micro-organisms. Furthermore, synthetic plastic sheeting itself also can be made up of different plastic materials such as linear low density polyethylene, polyvinyl chloride, crosslinked polyethylene, and the like.

For one particular application of the synthetic plastic sheeting, in accordance with the invention, the film forming the sheeting is provided in a sleeve form that can be fitted onto a section of a timber pole that is ordinarily disposed underground in the operative configuration of the timber pole. The sleeve can thus form a physical barrier in the form of a liquid impervious, non-bio-degradable layer of material over the section of the pole, where it is anticipated that sub-soil decay is most likely to occur. The biocide content of the film forming the sleeve will thus enhance the effective inhibition of micro-organism growth that will otherwise cause bio-deterioration of the pole.

In the FIGURE, there is illustrated a timber pole 10 that has a sleeve 12 formed of a flexible synthetic plastic film forming synthetic plastic sheeting, in accordance with the invention, fitted thereon, the sleeve typically being of low density polyethylene, which has predictable shrinkage qualities so that the location of the sleeve on the pole takes place by fitting the sleeve over the required region of the pole and then securely locating the sleeve by heat shrinking it onto the pole. It will be understood that the sleeve 12 fitted onto pole 10 can cover any desired region of the pole. In the FIGURE, sleeve 12 is shown covering the region of pole 10 that typically is most exposed to bio-deterioration as a result of the growth of micro-organisms, when supported in a soil body 14.

It will be understood also that synthetic plastic sheeting, in accordance with the invention, provided in different forms also can be applied onto timber poles to effectively form a sleeve as proposed and to thereby perform the function as suggested. Once again, the specific qualities of the sleeve will be determined by the soil characteristics of soil in which poles to be protected are to be supported. As such, different synthetic plastic materials can be used for different application, as well as different biocide compounds.

What is claimed is:

1. A sleeve formed of flexible synthetic plastic sheeting comprising a liquid impervious, non-biodegradable synthetic plastic film having a dry film biocide for inhibiting the growth of micro-organisms that cause bio-deterioration incorporated therein, the plastic sheeting forming the sleeve having heat shrink properties and the sleeve being dimensioned to fit slideably over a timber pole to be covered and, by heating, to shrink tightly onto the pole.

2. A sleeve as set forth in claim 1 wherein the dry film biocide incorporated into the synthetic plastic film comprises a mixture of methyl benzimidazole-2-YL 0 carbamate, 2-octyl-4-isothiazolinone-3-one and 3-(3,4-dichlorophenyl)-1,1-dimethyl urea.

3. A sleeve as set forth in claim 2 wherein the synthetic plastic film is selected from the group consisting of low density polyethylene, linear low density polyethylene, polyvinyl chloride and cross-linked polyethylene.

4. A sleeve as set forth in claim 3 wherein the synthetic plastic film is low density polyethylene.

5. A sleeve as set forth in claim 1 wherein the synthetic plastic film having the dry film biocide incorporated therein is formed by extruding a synthetic plastic material, the plastic material having the dry film biocide incorporated therein prior to the extrusion thereof.

6. A sleeve as set forth in claim 5 wherein the synthetic plastic material is provided in granular form and the dry film biocide is incorporated therein in a powder form prior to the extrusion of the synthetic plastic material.

7. A sleeve as set forth in claim 5 wherein the synthetic plastic material is provided in granular form and the dry film biocide is incorporated therein in liquid form prior to the extrusion of the synthetic plastic material.

8. In combination, a timber pole and a sleeve formed of flexible synthetic plastic sheeting comprising a liquid impervious, non-biodegradable synthetic plastic film having a dry film biocide for inhibiting the growth of micro-organisms that cause bio-deterioration incorporated therein, the plastic sheeting forming the sleeve having heat shrink properties and the sleeve being dimensioned to fit slideably over the timber pole, the sleeve being fitted onto a section of the pole and heat shrunk to secure the sleeve onto the pole.

9. A combination as set forth in claim 8 wherein the dry film biocide incorporated into the synthetic plastic film comprises a mixture of methyl benzimidazole-2-YL 0 carbamate, 2-octyl-4-isothiazolinone-3-one and 3-(3,4-dichlorophenyl)-1,1-dimethyl urea.

10. A combination as set forth in claim 9 wherein the synthetic plastic film is low density polyethylene.

11. A method for treating a timber pole to inhibit sub-soil bio-deterioration of the pole when supported in a soil body, the method comprising:

providing a sleeve formed of flexible synthetic plastic sheeting comprising a liquid impervious, non-biodegradable synthetic plastic film having a dry film biocide for inhibiting the growth of micro-organisms that cause bio-deterioration incorporated therein, the plastic sheeting forming the sleeve having heat shrink properties and the sleeve being dimensioned to fit slideably over the timber pole;

covering at least a portion of the pole exposed to sub-soil bio-deterioration when the pole is supported in the soil body by sliding the sleeve over the pole; and heating the sleeve to shrink the sleeve and secure the sleeve onto the pole.

12. A method for treating a timber pole as set forth in claim 11 wherein the dry film biocide incorporated into the synthetic plastic film comprises a mixture of methyl benzimidazole-2-YL 0 carbamate, 2-octyl-4-isothiazolinone-3-one and 3-(3,4-dichlorophenyl)-1,1-dimethyl urea.

13. A method for treating a timber pole as set forth in claim 12 wherein the synthetic plastic film is low density polyethylene.

* * * * *